United States Patent
Dalcher et al.

(10) Patent No.: US 8,739,188 B2
(45) Date of Patent: May 27, 2014

(54) SYSTEM, METHOD AND COMPUTER PROGRAM PRODUCT FOR DEFERRING INTERFACE MONITORING BASED ON WHETHER A LIBRARY ASSOCIATED WITH THE INTERFACE IS LOADED

(75) Inventors: Gregory William Dalcher, Tigard, OR (US); Joe C. Lowe, Aloha, OR (US)

(73) Assignee: McAfee, Inc., Santa Clara, CA (US)

( * ) Notice: Subject to any disclaimer, the term of this patent is extended or adjusted under 35 U.S.C. 154(b) by 1446 days.

(21) Appl. No.: 11/551,610

(22) Filed: Oct. 20, 2006

(65) Prior Publication Data

US 2013/0275573 A1  Oct. 17, 2013

(51) Int. Cl.
*G06F 3/00* (2006.01)
*G06F 9/44* (2006.01)
*G06F 9/46* (2006.01)
*G06F 13/00* (2006.01)

(52) U.S. Cl.
USPC .......................................................... 719/328

(58) Field of Classification Search
USPC .......................................................... 719/328
See application file for complete search history.

(56) References Cited

U.S. PATENT DOCUMENTS

| | | | |
|---|---|---|---|
| 6,003,095 A * | 12/1999 | Pekowski et al. | 717/163 |
| 6,721,941 B1 * | 4/2004 | Morshed et al. | 717/127 |
| 6,823,460 B1 * | 11/2004 | Hollander et al. | 726/3 |
| 2003/0115479 A1* | 6/2003 | Edwards et al. | 713/200 |
| 2004/0015877 A1* | 1/2004 | Arrouye et al. | 717/127 |
| 2006/0059156 A1* | 3/2006 | Janes et al. | 707/9 |
| 2006/0150256 A1* | 7/2006 | Fanton et al. | 726/27 |
| 2006/0161985 A1* | 7/2006 | Zhao | 726/24 |

* cited by examiner

*Primary Examiner* — Andy Ho
*Assistant Examiner* — Timothy A Mudrick
(74) *Attorney, Agent, or Firm* — Wong, Cabello, Lutsch, Rutherford & Brucculeri, LLP

(57) ABSTRACT

An interface monitoring system, method and computer program product are provided. In use, an interface is identified. In addition, monitoring of the interface is deferred based on whether a library associated with the interface is loaded.

14 Claims, 7 Drawing Sheets

SYSTEM, METHOD AND COMPUTER PROGRAM PRODUCT FOR DEFERRING INTERFACE MONITORING BASED ON WHETHER A LIBRARY ASSOCIATED WITH THE INTERFACE IS LOADED

FIELD OF THE INVENTION

The present invention relates to monitoring interfaces, and more particularly to monitoring interfaces contained in libraries.

BACKGROUND

Interfaces, such as application program interfaces (API's), are generally monitored for various reasons. For example, interfaces may be monitored for security purposes, for understanding a flow of applications, for tracking problems associated with applications, etc. Traditionally, monitoring interfaces has involved hooking the interfaces, such that invocations of the interfaces (e.g. via calls made with respect to the interfaces, etc.) are handled by a monitoring application. However, hooking interfaces contained in libraries [e.g. dynamic link libraries (DLLs)] may potentially cause problems when such libraries are artificially (e.g. prematurely, etc.) loaded for monitoring purposes.

There is thus a need for overcoming these and/or other problems associated with the prior art.

SUMMARY

An interface monitoring system, method and computer program product are provided. In use, an interface is identified. In addition, monitoring of the interface is deferred based on whether a library associated with the interface is loaded.

DETAILED DESCRIPTION

Figure 1:
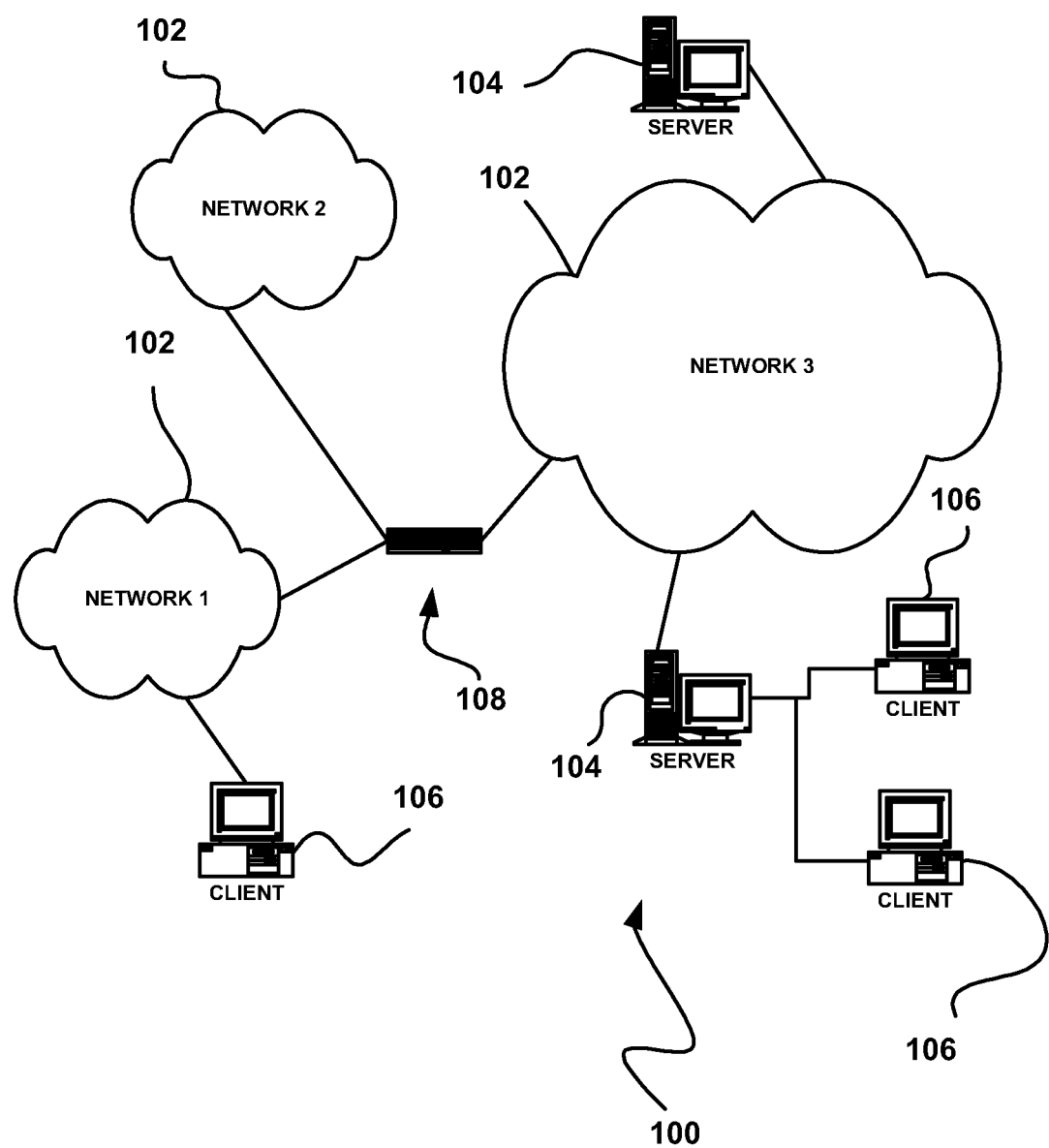
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wireless network, a wide area network (WAN) such as the Internet, peer-to-peer network, etc.

Coupled to the networks 102 are servers 104 which are capable of communicating over the networks 102. Also coupled to the networks 102 and the servers 104 is a plurality of clients 106. Such servers 104 and/or clients 106 may each include a desktop computer, lap-top computer, hand-held computer, mobile phone, personal digital assistant (PDA), peripheral (e.g. printer, etc.), any component of a computer/device, and/or any other type of logic, for that matter. In order to facilitate communication among the networks 102, at least one gateway 108 is optionally coupled therebetween.

Figure 2:
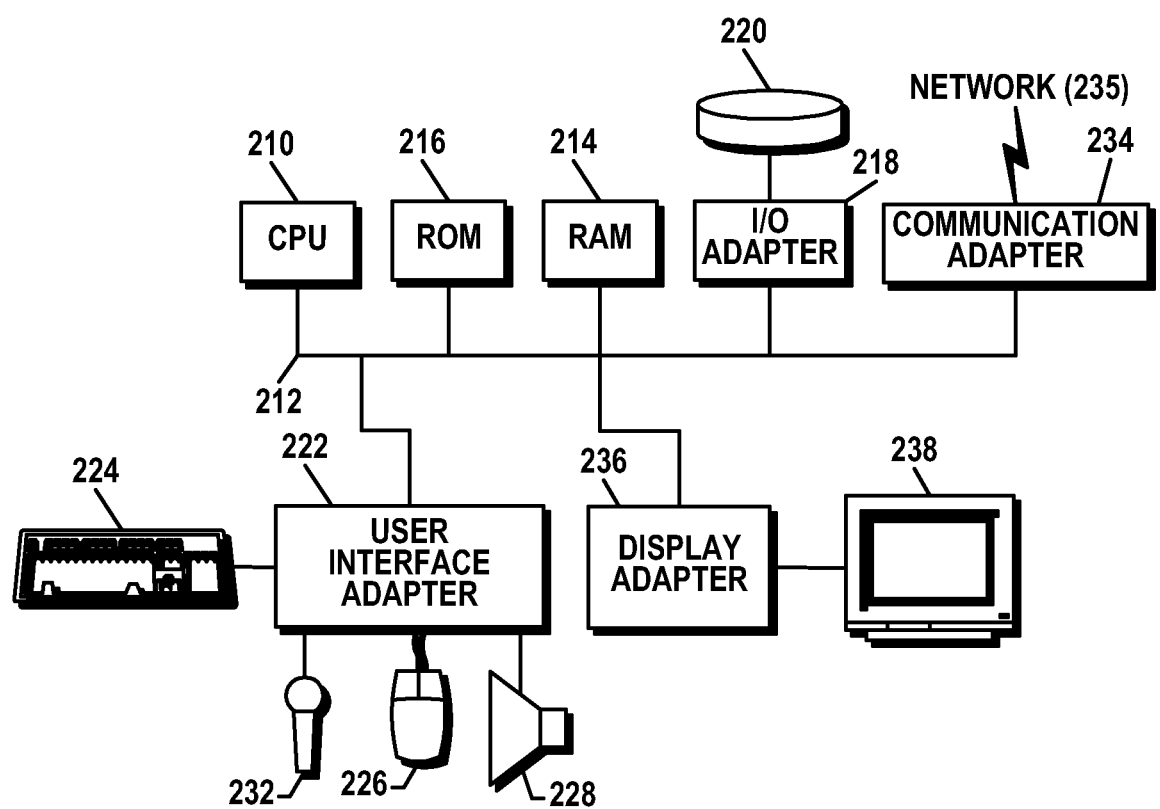
FIG. 2 shows a representative hardware environment that may be associated with the servers and/or clients of FIG. 1, in accordance with one embodiment.

FIG. 2 shows a representative hardware environment that may be associated with the servers 104 and/or clients 106 of FIG. 1, in accordance with one embodiment. Such figure illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Of course, the various embodiments set forth herein may be implemented utilizing hardware, software, or any desired combination thereof. For that matter, any type of logic may be utilized which is capable of implementing the various functionality set forth herein.

Figure 3:
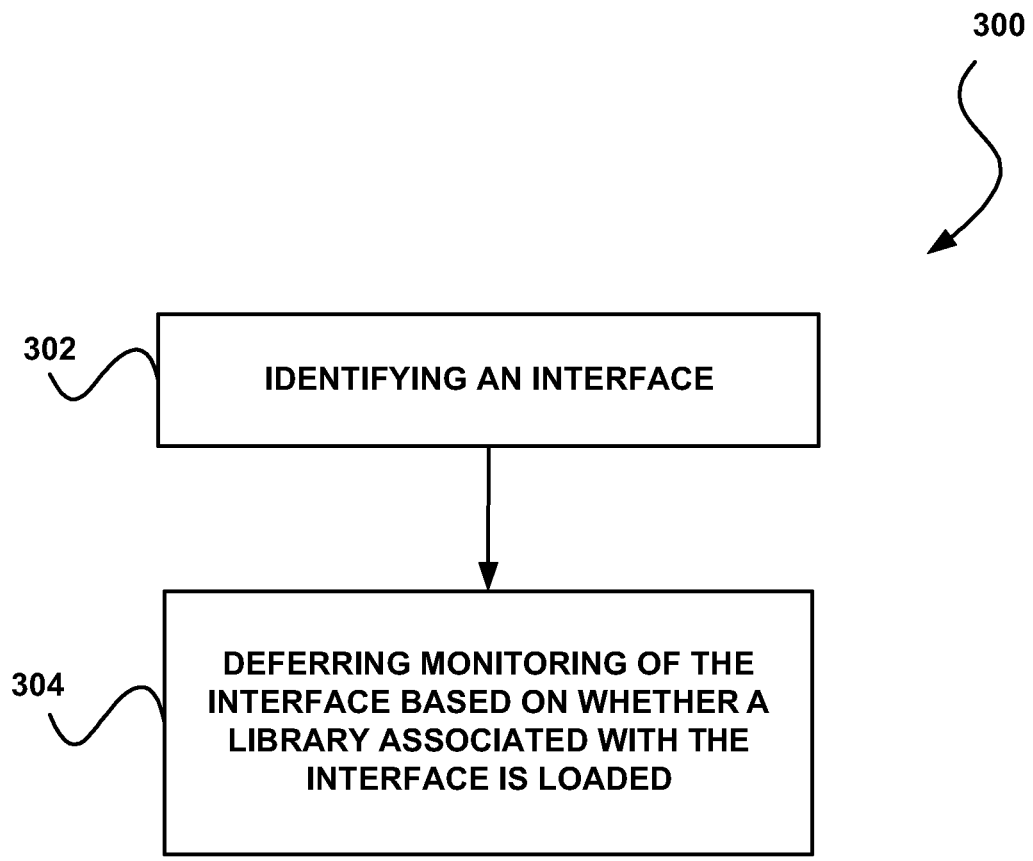
FIG. 3 shows a method for monitoring an interface, in accordance with one embodiment.

FIG. 3 shows a method 300 for monitoring an interface, in accordance with one embodiment. As an option, the method 300 may be implemented in the context of the architecture and environment of FIGS. 1 and/or 2. Of course, however, the method 300 may be carried out in any desired environment.

As shown in operation 302, an interface is identified. In the context of the present description, the interface may include any computer code, data structure, or protocol that facilitates communication between a first instance of hardware or software, with another instance of hardware or software. In one optional embodiment, such hardware or software may be a component of any of the devices described above with respect to FIG. 1. In another embodiment, the interface may include a software interface. For example, the interface may include an application programming interface (API) for facilitating communication between an application and an underlying operating system.

Additionally, the interface may be identified, in one possible embodiment, by identifying an invocation of the interface. Optionally, such invocation of the interface may involve a call to the interface. In another embodiment, the call to the interface may be made by an application. Of course, it should be noted, however, that the interface may be identified in any desired manner that at least potentially prompts the monitoring thereof.

Still yet, monitoring of the interface is deferred based on whether a library associated with the interface is loaded, as shown in operation 304. In the context of the present description, the library may include any collection of computer code that may be used by other computer code. In one optional embodiment, the library may include a library that, at least in part, contains the interface. In this way, the library may include a hosting library that hosts the interface.

As another option, the library may include at least one linked library. For example, loading of the library may optionally include loading any linked libraries associated therewith. In one exemplary embodiment, the linked library may include a dynamic link library (DLL). Thus, the library associated with the interface may be loaded explicitly (e.g. independent of linked libraries, etc.) or implicitly (e.g. as a library linked to another library being loaded, etc.).

Further, it should be noted that the library may be loaded in any desired manner. Just by way of example, the library may be loaded into a process. Of course, such loading may include anything that results in the library being made, at least in part, accessible to the computer code adapted for using the same.

Moreover, monitoring of the interface may include hooking the interface, in one exemplary embodiment. Such hooking may even allow a flow of the interface (and an application associated therewith, etc.) to be monitored. Of course, in the context of the present description, such interface monitoring may involve the identification of any desired aspect of the interface, for any purpose.

In one embodiment, the interface monitoring may be initiated if it is determined that the library associated with the interface is loaded. In another embodiment, the interface monitoring may be deferred if it is determined that the library associated with the interface is not loaded. In this way, artificial (e.g. premature, etc.) loading of the library for monitoring purposes may optionally be avoided, which may therefore possibly limit the amount of intrusion necessary for monitoring the interface.

More illustrative information will now be set forth regarding various optional architectures and features of different embodiments with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
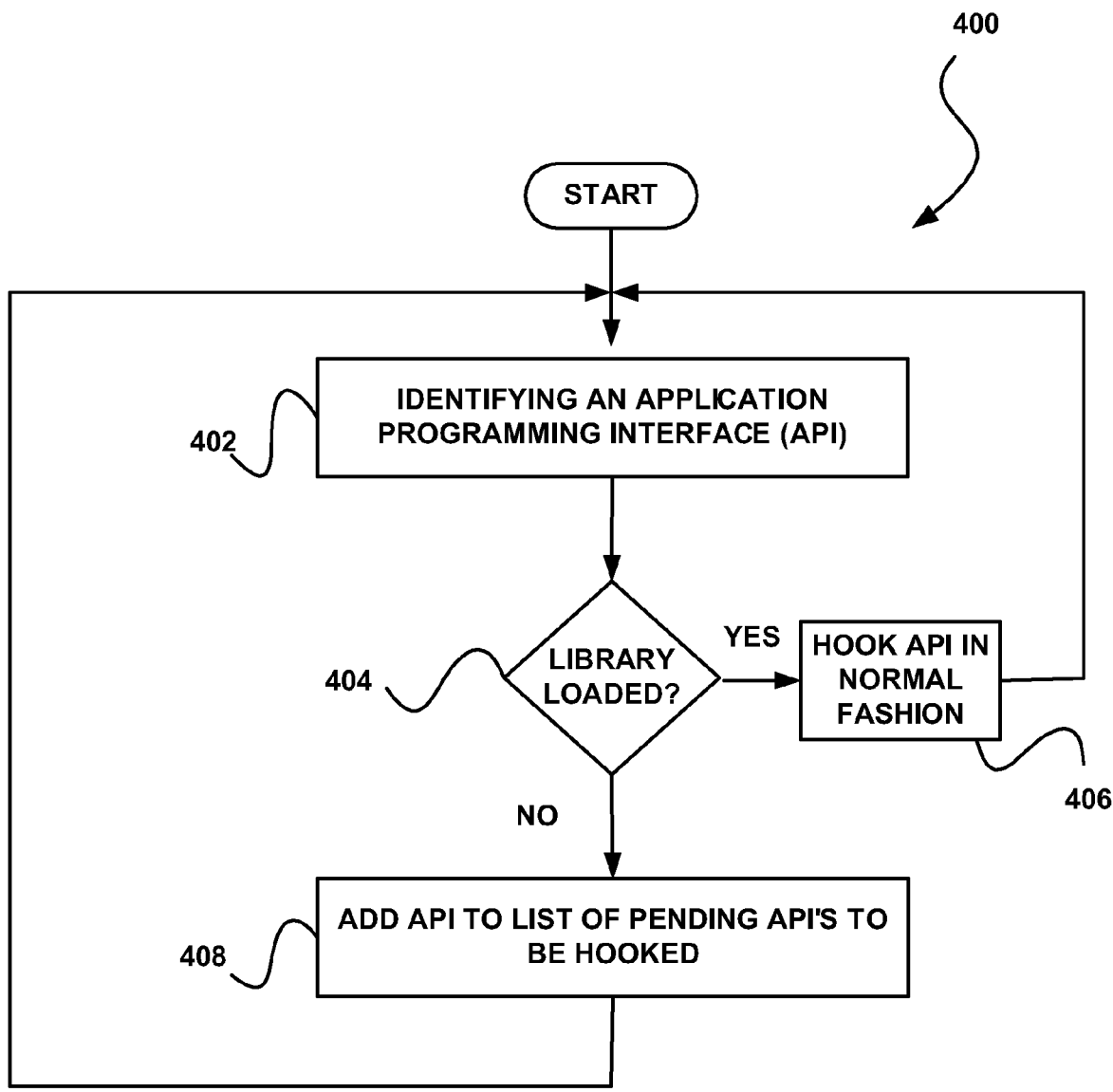
FIG. 4 shows a method for deferring monitoring of an interface, in accordance with another embodiment.

FIG. 4 shows a method 400 for deferring monitoring of an interface, in accordance with another embodiment. As an option, the method 400 may be implemented in the context of the architecture and environment of FIGS. 1-3. Of course, however, the method 400 may be carried out in any desired environment. It should also be noted that the aforementioned definitions may apply during the present description.

As shown in operation 402, an API is identified. As described above with respect to FIG. 3, the API may be identified based on an invocation of the API (e.g. a call made to the API, etc.). Of course, however, the API may be identified in any desired manner.

It is then determined whether a library associated with the API has been loaded, as shown in decision 404. For example, such library may be loaded in an associated process. In one embodiment, the determination may be made based on an interception of an invocation of a library loading interface (e.g. Microsoft Windows® LoadLibrary interface, etc.).

In another embodiment, the determination may be made by intercepting a file system event. Optionally, such file system event may be intercepted by a file system filter. Further, the file system event may indicate that the library has been loaded. Just by way of illustration, the file system event may involve mapping a file that contains an on-disk image of the library. Of course, it should be noted that it may be determined that the library associated with the API has been loaded in any desired manner.

If it is determined that the library associated with the API has been loaded, the API is hooked in a normal fashion, as shown in operation 406. The API may be hooked by intercepting calls made in association with the API, for example. Thus, determining that the library associated with the API has been loaded may indicate that the API is reliably available for monitoring purposes.

If, however, it is determined that the library associated with the API has not been loaded, the API is added to a list of pending API's to be hooked, as shown in operation 408. Such list of pending API's to be hooked may include any number of API's which have been identified (as in operation 402), but for which a library has not yet been loaded. It should be noted that the list of pending API's to be hooked may include any desired data structure (e.g. queue, list, database, etc.) capable of storing data associated with API's to be hooked. Thus, API's may be processed based on whether an associated library has been loaded, in a manner that will be set forth.

Figure 5:
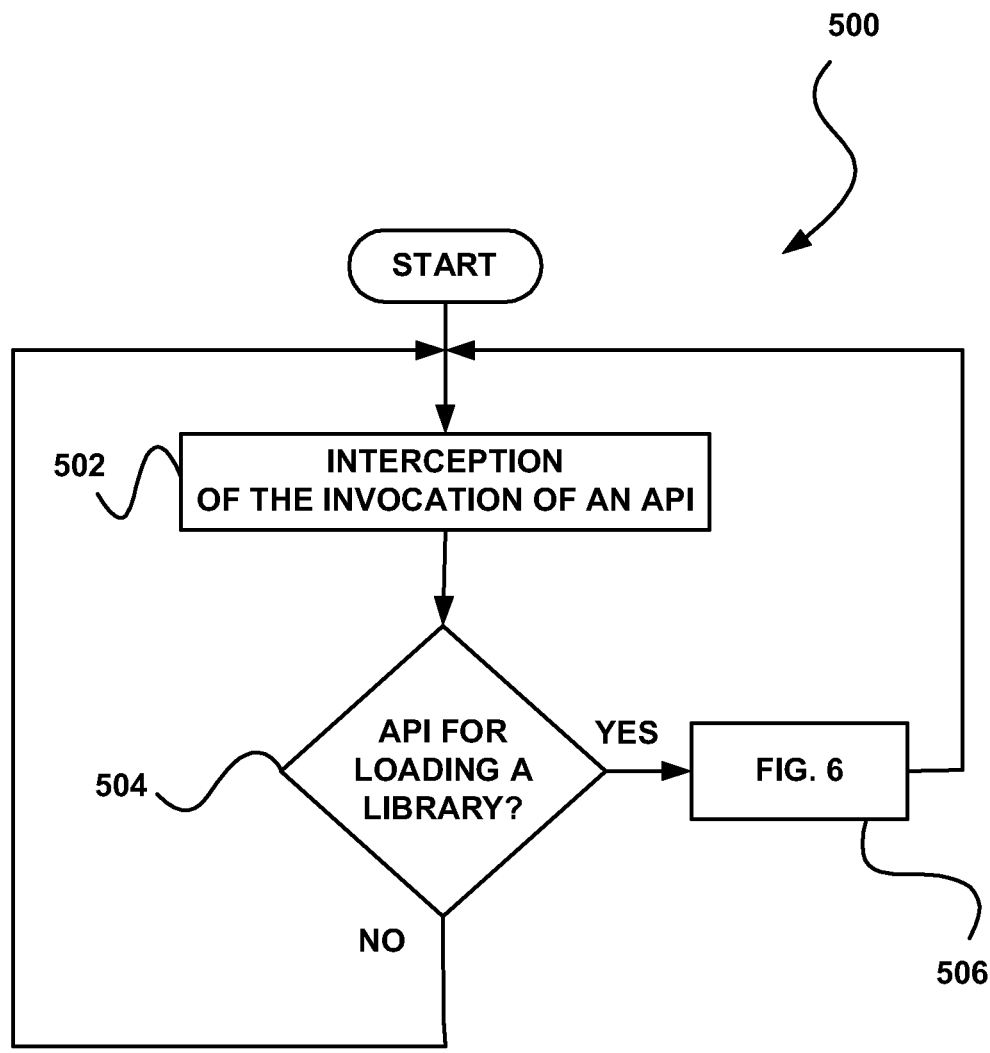
FIG. 5 shows a method for identifying a library that has been loaded, in accordance with yet another embodiment.

FIG. 5 shows a method 500 for identifying a library that has been loaded, in accordance with yet another embodiment. As an option, the method 500 may be implemented in the context of the architecture and environment of FIGS. 1-4. For example, the method 500 of FIG. 5 may be carried out independent from/in parallel with the method 400 of FIG. 4. Of course, however, the method 500 may be carried out in any desired environment. It should also be noted that the aforementioned definitions may apply during the present description.

As shown in operation 502, an invocation of an API is intercepted. The invocation of the API may be intercepted by monitoring API invocations (e.g. calls made to the API, etc.). In one optional embodiment, the invocation of the API may be intercepted by hooking the API. In use, the invocation of the API may be performed within a process that is independent/separate from a monitoring of API's.

It is then determined whether the API is utilized, at least in part, for loading a library, as shown in decision 504. In one embodiment, such determination may be made by following the flow of the invoked API. From such flow, it may be determined if a request to load a library has been made by the API.

If it is determined that the API is not utilized, at least in part, for loading a library, a next invocation of an API may be intercepted, in a similar manner as described above with respect to operation 502. If, however, it is determined that the API is utilized, at least in part, for loading a library, a list of API's for which monitoring is pending may be processed, as described in more detail with respect to FIG. 6. In addition, a next invocation of an API may be intercepted as described above with respect to operation 502. In this way, libraries that have been loaded may be continuously identified, such that API's within the list of API's (for which monitoring is pending) may be processed to determine whether monitoring may be initiated.

In another embodiment, and as described above with respect to FIG. 4, loaded libraries may be identified based on intercepted file system events. For example, such file system events may indicate that a library has been loaded. Accordingly, file system events may be identified by monitoring such file system events.

Figure 6:
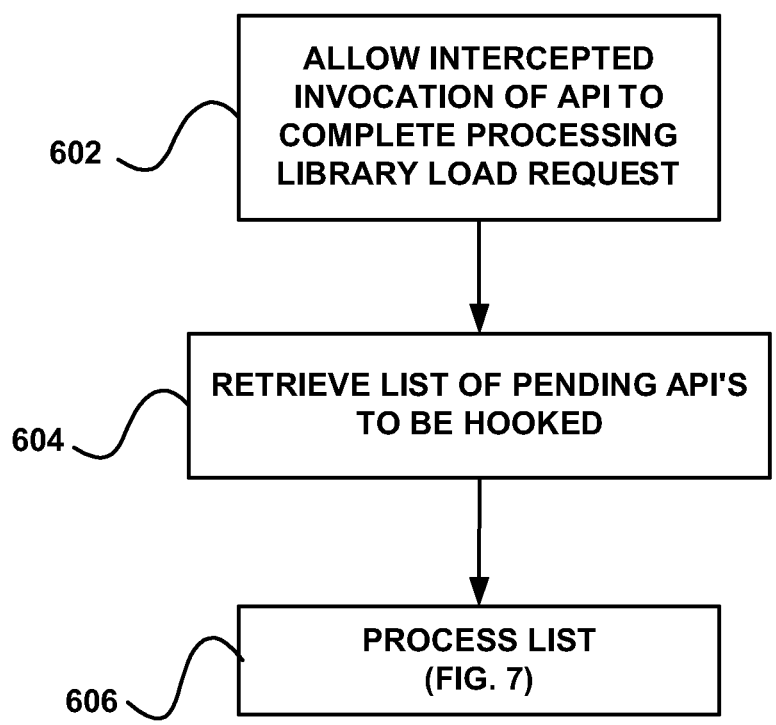
FIG. 6 shows a method for initiating processing of a list of interfaces for which monitoring is pending, upon the loading of a library, in accordance with still yet another embodiment.

FIG. 6 shows a method 600 for initiating processing of a list of interfaces for which monitoring is pending upon the loading of a library, in accordance with still yet another embodiment. As an option, the method 600 may be implemented in the context of the architecture and environment of FIGS. 1-5. Specifically, the method 600 may be initiated in operation 506 of FIG. 5. Of course, however, the method 600 may be carried out in any desired environment. It should also be noted that the aforementioned definitions may apply during the present description.

As shown in operation 602, the intercepted invocation of an API is allowed to complete processing of a library load request. Accordingly, such API may be utilized in loading a library, such as that described above with respect FIG. 5. As a result, a library is allowed to be loaded based on a library load request associated with the API.

The list of pending API's to be hooked is then retrieved, as shown in operation 604. The list of pending API's to be hooked may be retrieved by being read, accessed, etc. Further, as shown in operation 606, the list of pending API's to be hooked is processed.

One example of processing such list of pending API's to be hooked will now be described in more detail with respect to FIG. 7. Specifically, the list of pending API's to be hooked may be processed based on the identified library load request. Of course, it should be noted that such list may be processed in any desired manner that results in a potential situation where additional API's (with loaded libraries) may be monitored.

Figure 7:
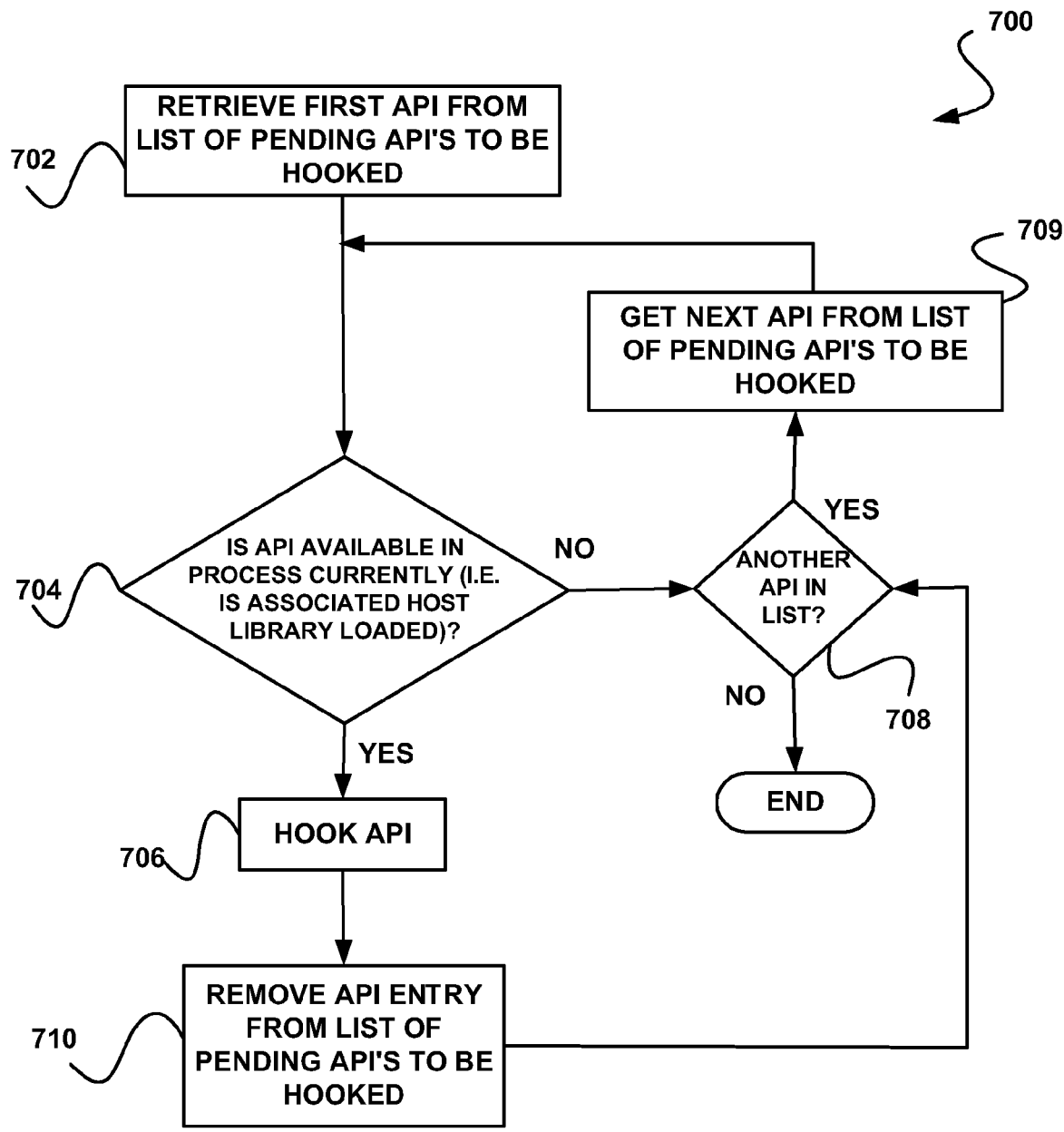
FIG. 7 shows a method for processing a list of interfaces for which monitoring is pending, in accordance with another embodiment.

FIG. 7 shows a method 700 for processing a list of interfaces for which monitoring is pending, in accordance with another embodiment. As an option, the method 700 may be implemented in the context of the architecture and environment of FIGS. 1-6. Specifically, the method 700 may be initiated in operation 606 of FIG. 6. Of course, however, the method 700 may be carried out in any desired environment. It should also be noted that the aforementioned definitions may apply during the present description.

As shown in operation 702, a first API is retrieved from the list of pending API's to be hooked. The first API may be retrieved by reading such API from the list, for example. It is then determined whether the API is available in a current process, as shown in decision 704. In particular, it is determined whether a library (e.g. host library, etc.) associated with the API is loaded (by virtue of the library load request noted in operation 602 of FIG. 6).

If it is determined that such a library is loaded, the API is hooked, as shown in operation 706. Accordingly, a determination that the library is loaded may indicate that the API is available for hooking. In addition, an entry for such API (e.g. data associated therewith, etc.) is removed from the list of pending API's to be hooked, as set forth in operation 710. Thus, the list of pending API's to be hooked may be updated as libraries associated with API's included therein are loaded.

If, however, it is determined that such a library is not loaded, then it is determined whether there is another API in the list of API's to be hooked. Note operation 708. Thus, API's for which a library has not been loaded may remain in the list until an associated library is loaded. As shown, it may also be determined whether there is another API in the list upon removing an API entry from such list (operation 710). If it is determined that another such API exists, the next API in the list of API's to be hooked is retrieved, as shown in operation 709.

In this way, each API in the list of API's to be hooked may be checked to determine if a library associated therewith has been loaded. In the context of a primary loaded library that includes at least one linked library (e.g. a linked library that has been loaded as a consequence of the loading of the primary library, etc.), the identification of the loaded library, as described in FIG. 6, may allow API's in the list to be checked against all loaded libraries, including such linked libraries. As a result, API's in the list may be checked against all loaded libraries regardless of the identified loaded library that initiated such a check. Thus, API's available for hooking may be efficiently identified.

In addition, the utilization of a list of pending API's to be hooked may limit intrusion with respect to artificially (e.g. prematurely, etc.) loading libraries for monitoring purposes. In particular, libraries may be allowed to load as they normally would in a situation not including any sort of monitoring, such that monitoring of associated API's may be deferred until associated libraries are loaded.

Accordingly, a plurality of situations associated with artificially loading such libraries may optionally be prevented. In one embodiment, side effects within a process that would not normally be utilized for loading a library may be avoided. For example, library initialization code associated with a library that could potentially cause problems within a process (in which such code would not normally be run) may be prevented.

In another embodiment, timing within a process in which a library would normally be run in may be maintained. For example, library initialization code that is dependent on a load order with respect to other libraries may be run such that the load order is maintained. By way of illustration, it may be ensured that a persistent variable that library initialization code depends upon is available at the time the library is loaded.

Moreover, a reference count associated with the library may be prevented from being increased such that the library is incapable of being unloaded. Thus, processes expecting to unload and/or reload the library (e.g. for updating purposes, etc.) may not necessarily encounter any problems that may otherwise occur if the library is artificially loaded for monitoring purposes. In this way, such processes may be able to proceed in a normal fashion.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:

identifying, utilizing a processor, an invocation of an interface, the interface configured to facilitate communication between a first instance of hardware or software and a second instance of hardware or software;

determining, with the processor and in response to the invocation of the interface, whether a library associated with the interface has been previously loaded;

monitoring the interface, with the processor, only when it is determined that the library associated with the interface has been previously loaded; and deferring monitoring of the interface until the library associated with the interface has already been loaded, wherein deferring monitoring of the interface comprises:

adding an indicator for the interface to a list of pending interfaces to be monitored;

detecting a request to load a new library;

determining whether the new library is associated with any interface having the indicator for the interface in the list of pending interfaces to be monitored; and monitoring the interface associated with the indicator only after it has determined that the library associated with the interface has been loaded.

2. The method of claim 1, wherein the act of monitoring the interface includes hooking the interface.

3. The method of claim 1, further comprising removing, with the processor, the interface that is associated with the new library from the list of pending interfaces when it is determined that the interface is associated with the new library.

4. A non-transitory computer readable medium, comprising instructions stored thereon to cause a processor to:
   identify an invocation of an interface, the interface configured to facilitate communication between a first instance of hardware or software and a second instance of hardware or software;
   determine, in response to the invocation of the interface, whether a library associated with the interface has been previously loaded;
   monitor the interface only when it is determined that the library associated with the interface has been previously loaded; and
   defer monitoring of the interface until the library associated with the interface has already been loaded;
   wherein the instructions to cause the processor to defer monitoring of the interface comprise instructions to cause the processor to:
      add an indicator for the interface to a list of pending interfaces to be monitored;
      detect a request to load a new library;
      determine whether the new library is associated with any interface having the indicator for the interface in the list of pending interfaces to be monitored; and
      monitor the interface associated with the indicator only after it has determined that the library associated with the interface has been loaded.

5. The computer readable medium of claim 4, wherein the interface includes an application program interface.

6. The computer readable medium of claim 4, wherein the instructions to cause a processor to determine whether the library associated with the interface has been loaded include instructions to cause the processor to determine whether a library that contains the interface has been loaded.

7. The computer readable medium of claim 4, wherein the library includes a dynamic link library.

8. The computer readable medium of claim 4, wherein the instructions to cause a processor to monitor the interface include instructions to cause the processor to monitor the interface by hooking the interface.

9. The computer readable medium of claim 4, further comprising instructions stored thereon to cause the processor to remove the interface that is associated with the new library from the list of pending interfaces when it is determined that the interface is associated with the new library.

10. The computer readable medium of claim 4, wherein the instructions to cause a processor to determine whether the library associated with the interface has been previously loaded include instructions to cause the processor to intercept a file system event.

11. The computer readable medium of claim 10, wherein the instructions to cause a processor to intercept the file system event include instructions to cause the processor to intercept the file system event by mapping a file that contains an on-disk image of the library associated with the interface.

12. The computer readable medium of claim 4, wherein the instructions to cause a processor to detect the request to load the new library include instructions to cause the processor to intercept an invocation of a library loading interface.

13. The computer readable medium of claim 4, wherein the instructions to cause a processor to determine whether the library associated with the interface has been loaded include instructions to cause the processor to evaluate a flow of the interface to determine whether a request to load the library has been made by the interface.

14. A system, comprising:
   a memory; and
   a processor operatively coupled to the memory, the processor adapted to execute instructions stored in the memory, comprising instructions that when executed cause the processor to:
      identify an invocation of an interface, the interface configured to facilitate communication between a first instance of hardware or software and a second instance of hardware or software;
      determine, in response to the invocation of the interface, whether a library associated with the interface has been previously loaded;
      monitor the interface only when it is determined that the library associated with the interface has been previously loaded; and
      defer monitoring of the interface until the library associated with the interface has already been loaded;
      wherein the instructions to cause the processor to defer monitoring of the interface comprise instructions to cause the processor to:
         add an indicator for the interface to a list of pending interfaces to be monitored;
         detect a request to load a new library;
         determine whether the new library is associated with any interface having the indicator for the interface in the list of pending interfaces to be monitored; and
         monitor the interface associated with the indicator only after it has determined that the library associated with the interface has been loaded.

* * * * *